United States Patent [19]

Maxey

[11] Patent Number: 4,619,484
[45] Date of Patent: Oct. 28, 1986

[54] SIDE UNLOADING DUMP TRUCK

[76] Inventor: John H. Maxey, 5509 Oakdale Ave., Woodland Hills, Calif. 91364

[21] Appl. No.: 651,572

[22] Filed: Sep. 17, 1984

[51] Int. Cl.$^4$ .............................................. B60B 1/16
[52] U.S. Cl. ..................................... 298/18; 105/264; 105/275; 298/10; 298/11; 414/468; 414/470
[58] Field of Search ....................... 298/18, 17.5, 17.7, 298/17.8, 22 P, 10, 11; 414/468, 470, 471; 105/261 R, 264, 265, 268, 269, 275

[56] References Cited

U.S. PATENT DOCUMENTS

| | | | |
|---|---|---|---|
| 3,258,270 | 6/1966 | Ferris | 298/17.5 |
| 3,884,526 | 5/1975 | Sweet et al. | 298/18 X |
| 4,200,334 | 4/1980 | Lindholm | 414/470 X |

FOREIGN PATENT DOCUMENTS 514869 2/1928 Fed. Rep. of Germany ...... 105/264

Primary Examiner—Leslie J. Paperner
Assistant Examiner—Janice Krizek
Attorney, Agent, or Firm—John J. Posta, Jr.

[57] ABSTRACT

The improved assembly includes a truck having a generally horizontal trailer frame supported on rotatable wheels. The upper surface of the frame preferably includes a dished portion adapted to receive the assembly's open-topped, curved container bin, and also includes spaced rollers rotatably supporting the bin above the bottom surface of the dished portion. An upwardly directed tilt link is pivotally connected to at least one end of the frame adjacent one side thereof and to the upper end of the bin adjacent the opposite side thereof. A ram, preferably hydraulic, is pivotally connected to the side of the frame at a point remote from the tilt link and extends upwardly to pivotally connect to the upper part of the bin. If desired, a pair of tilt links can be used at opposite ends of the frame, with the ram spaced therebetween. During extension of the ram, the bin initially rotates on the rollers, without lateral displacement, enabling side loading from low slung bucket arms. Such rotation continues until restrained by the tilt link, whereupon further ram extension effects lifting of one side of the bin from the rollers and pivoting of the lifted side around the opposite side of the bin. The assembly is simple, durable and efficient, minimizing damage to the bin and effecting rapid loading and unloading.

13 Claims, 13 Drawing Figures

U.S. Patent  Oct. 28, 1986  Sheet 1 of 4  4,619,484
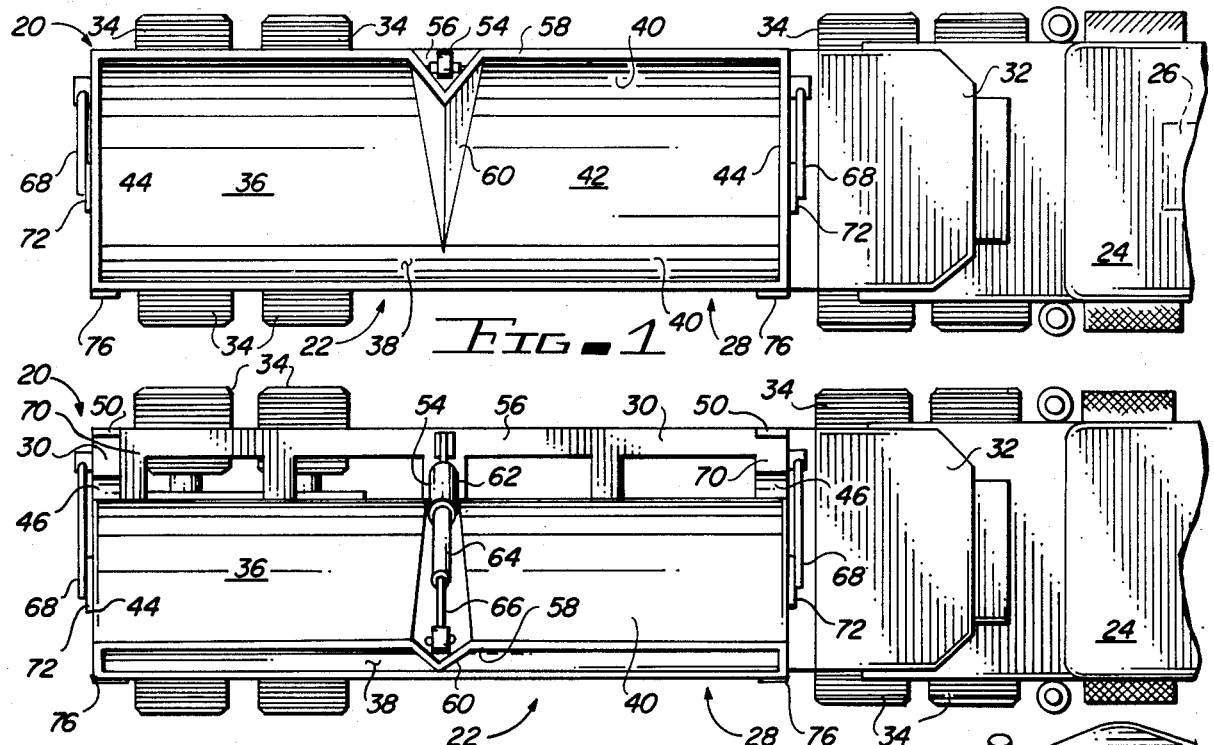
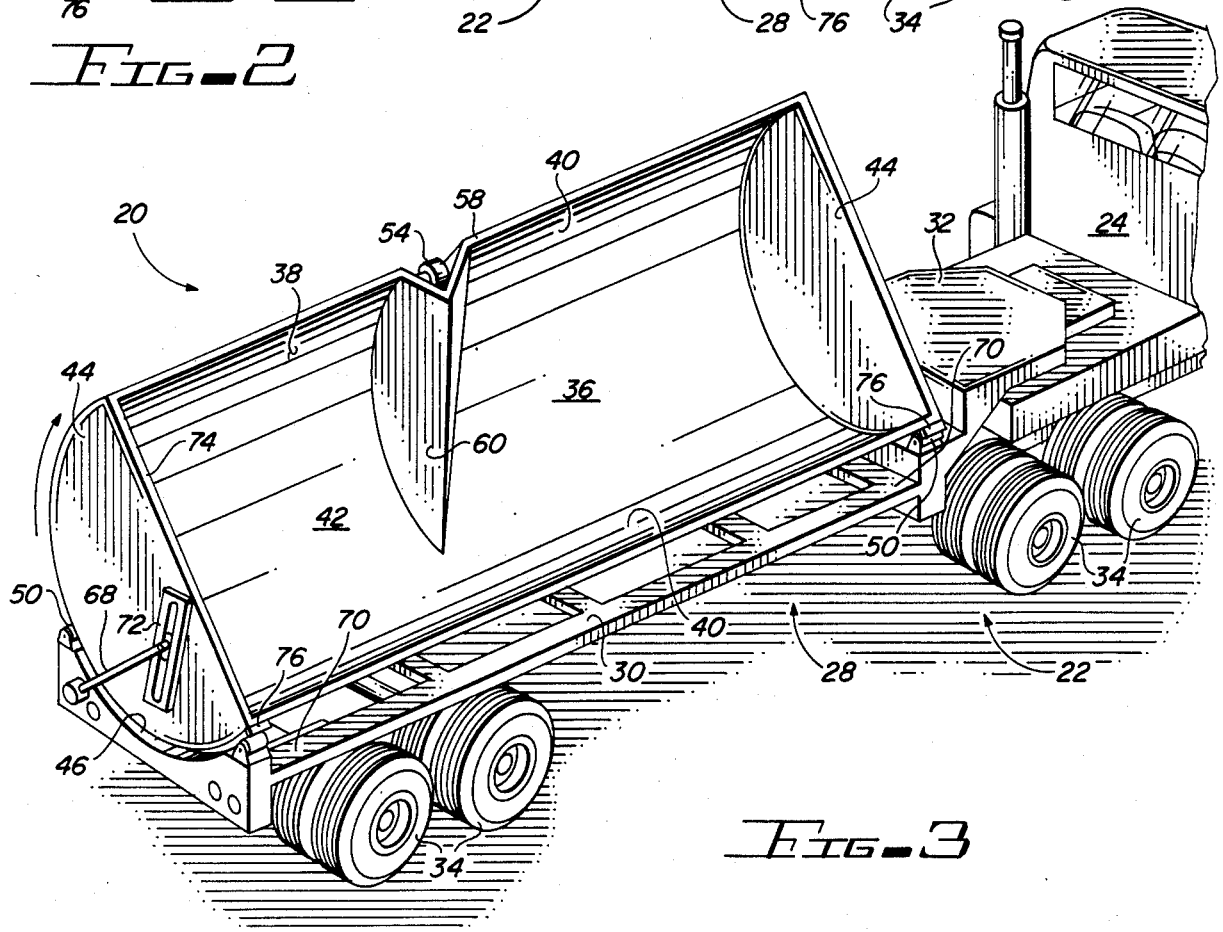

SIDE UNLOADING DUMP TRUCK

BACKGROUND OF THE INVENTION

1. Field of the Invention

The present invention generally relates to dumping vehicles and, more particularly, to an improved side loading and unloading dump truck assembly.

2. Prior Art

Various types of dump trucks and similar vehicles are in current use for such activities as building and road construction, garbage hauling, mining, land clearing, etc. Most such vehicles employ stationary bins or bins which can be tilted up at the front end thereof to unload through a rear gate. Some of such bins are rearwardly removable from the support trucks to facilitate loading and unloading. Certain other such vehicles unload and load from the side. See, for example, U.S. Pat. No. 2,653,052 for a device employing a bin which tilts sideways under the action of an hydraulic ram, to unload. U.S. Pat. Nos. 3,450,436; 4,242,031; 3,655,218 and 3,884,526 also disclose similar devices, most of which are generally very complicated and expensive. A few such vehicles, mostly cement trucks and the like, employ, instead, a cylindrical drum which rotates on rollers. See, for example, U.S. Pat. No. 3,258,270 wherein a complicated chain drive is involved.

Most conventional dump trucks have bins which are subject to severe denting and damage over a period of use and eventually require replacement. This occurs when dredge buckets and the like are forced to clear the upraised bin sides and then drop heavy rocks, stones, and debris, etc. down into the bin from a height. Certain low-slung dredges cannot even be used to load conventional dump trucks unless the trucks are driven into a ground depression, or unless the dredge is raised. When low-slung dredges can raise their bucket arms or booms high enough to clear the truck bin sides, the dumping height may actually be increased with increased bin damage, because of the boom angle involved. Those side loading trucks which tilt their bins exert considerable energy in doing so.

Accordingly, there is a need for an improved, inexpensive, durable and efficient dump truck assembly which will facilitate rapid loading and unloading of heavy loads without damage to the truck bin and with a minimum amount of energy expenditure.

SUMMARY OF THE INVENTION

The improved dump truck assembly of the present invention satisfies all the foregoing needs. The assembly is substantially as set forth in the Abstract above. Thus, the assembly comprises a dump truck having a motor, cab and generally horizontal trailer frame supported by spaced wheels. The frame supports the assembly's container bin, which is open-topped and preferably has curved sides and bottom, and is preferably in a dished depression in the upper surface thereof, flanked and supported by spaced rollers.

Thus, the bin can easily be rolled around its longitudinal axis with a minimum expenditure of energy and without moving laterally, so as to expose its open top for easy side loading and unloading using shovel buckets, dredge buckets, etc., without damaging the bin. An hydraulic ram is pivotally connected to the side of the frame and to the bin, so as to be able to initiate such rotation by the ram when it extends itself.

A tilt link in the form of an elongated arm is pivotally secured to one end of the frame, preferably adjacent the frame side to which the hydraulic ram is connected, but at a point remote from the ram and is also pivotally secured to the top of the bin adjacent the opposite side of the frame. The tilt link acts as a brace and also limits the extent of the described tilting of the bin by means of the ram. Separate stop means in the form of a roller-engaging ledge or the like may be positioned on the bin upper edge on the side away from the ram to prevent disengagement of that side's rollers and the bin. Further extension of the ram results in the bin side to which it is connected lifting up from the rollers, tilting sideways and pivoting around the opposite bin side still supported on the rollers. This action can be continued by the ram until the top of the bin is vertical, so as to assure rapid bin loading and unloading, or even until the bin is inverted and has moved laterally to assure even more rapid and complete unloading from the bin. The ram, tilt link and ledge securely brace the bin abainst the rollers on one side of the frame. If desired, a pair of tilt links can be used on opposite ends of the frame, with the ram preferably about midway therebetween on one side of the frame.

Also, the tilt link can take the form of a hydraulic ram rather than a rigid arm.

The described initial rotation (rolling) of the bin around its own axis on the rollers can be successfully employed to load the bin from boom buckets by, in effect, rapidly and with little energy lowering one side of the bin 20–40% or so, so that the load need not be dumped from a damaging height into the bin, but can be laid in the bin. Tilting of the bin need not be resorted to until the bin is to be unloaded. This dual function for the assembly conserves energy and prevents bin damage. Further features of the improved dump truck assembly of the present invention are set forth in the following detailed description and accompanying drawings.

DRAWINGS

FIG. 1 is a schematic top plan view of a first preferred embodiment of the improved dump truck assembly of the present invention, showing the bin thereof in the upright resting position;

FIG. 2 is a schematic top plan view of the assembly of FIG. 1, showing the bin thereof in the inverted dump mode;

FIG. 3 is a schematic perspective view of the assembly of FIG. 1 in the dump mode with the bin top vertical;

DETAILED DESCRIPTION

FIGS. 1-7

Figure 4:
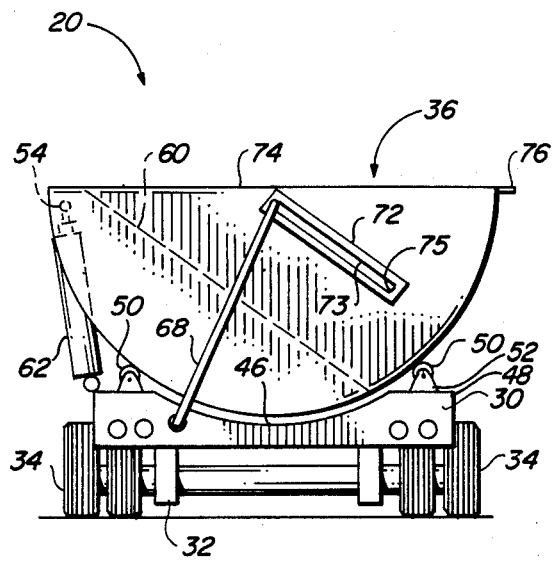
FIG. 4 is a schematic rear elevation of the assembly of FIG. 1 with the bin thereof in the resting position of FIG. 1.

Now referring more particularly to FIGS. 1-7 of the drawings, a first preferred embodiment of the improved dump truck assembly of the present invention is schematically depicted therein. Thus, assembly 20 is shown which comprises a dump truck 22 having a cab 24 containing a motor 26 adapted to pull a detachable trailer 28 connected thereto. Trailer 28 comprises an upper horizontal frame 30 secured to a lower chassis 32 having wheels 34. It will be understood that, if desired, truck 22 could be a unitary flat bed truck (not shown) instead of the detachable cab 24 and trailer 28 described herein.

Frame 30 supports bin 36, which preferably has an open top 38 and curved sides 40 and bottom 42 with vertical endwalls 44, in a curved dished portion 46 in the upper surface 48 thereof, with spaced longitudinal rollers 50 held in supports 52 secured to surface 48 and flanking portion 46. Thus, bin sides 40 rest against rollers 50 so as to be spaced slightly away from surface 48 in portion 46, thereby enabling bin 36 to be more easily rotated around its longitudinal axis.

A ram 54 is pivotally secured to one side 56 of frame 30 and extends upwardly to pivotally connect to the upper edge 58 of side 40 of bin 36, as shown in FIGS. 1-7. In order to accommodate ram 54 and facilitate its free extension, the side 40 to which it's connected may have v-shaped groove 60, disposed upwardly therein, as shown in FIGS. 1-3. Ram 54 is preferably hydraulically powered and controlled by conventional means (not shown) from cab 24. It includes telescoping sections 62, 64 and 66. Ram 54 is used to support, brace and rotate bin 36, as more particularly described below.

Assembly 20 also includes a pair of tilt links 68, which are pivotally connected to opposite ends 70 of frame 30 (FIGS. 1-3), preferably adjacent side 56, and are also pivotally connected to slide retainers 72 having channels 73 therein. Accordingly, links 68 extend upwardly across frame 30 and brace and support bin 36.

Links 68 also have the effect of restricting the extent of tilting of bin 36 in portion 46 on rollers 50. Thus, rotation of bin 36 around its longitudinal axis from the resting position of FIGS. 1 and 4 to that of FIG. 5 without tilting is initiated by initially extending ram 54. This, in effect lowers one of the sides 40 of bin 36, rendering its open top 38 more accessible to low-slung dredge bucket booms, permitting easier loading and unloading of bin 36 with a minimum expenditure of energy. This also eliminates having the load dropped any appreciable distance from a dredge bucket or power shovel into bin 36, thereby eliminating risk of resulting damage to bin 36. Instead, the bucket or shovel can enter bin 36 directly from the side and lay the load directly at load level in bin 36. The upper edge 58 of that side 40 of bin 36 is fitted with stop means in the form of a ledge 76 adapted to engage rollers 50 on that side. Ledge 76 projects outwardly and/or downwardly from the indicated edge 58, as shown particularly in FIGS. 4-7.

Figure 6:
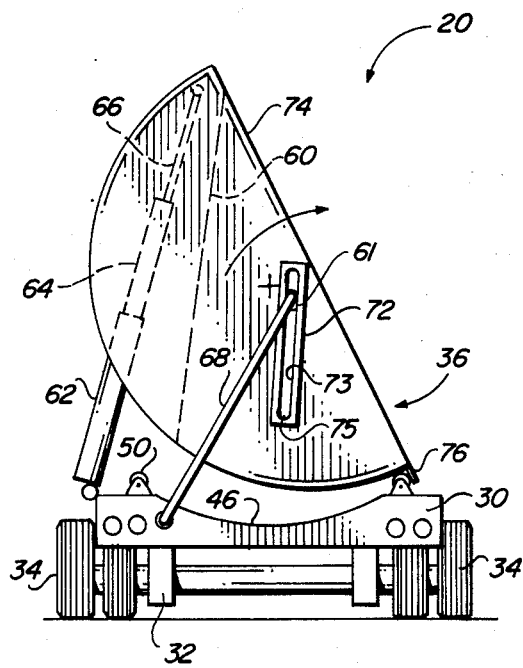
FIG. 6 is a schematic rear elevation of the assembly of FIG. 1, shown with the bin thereof tilted so that the top thereof is about vertical.
Figure 7:
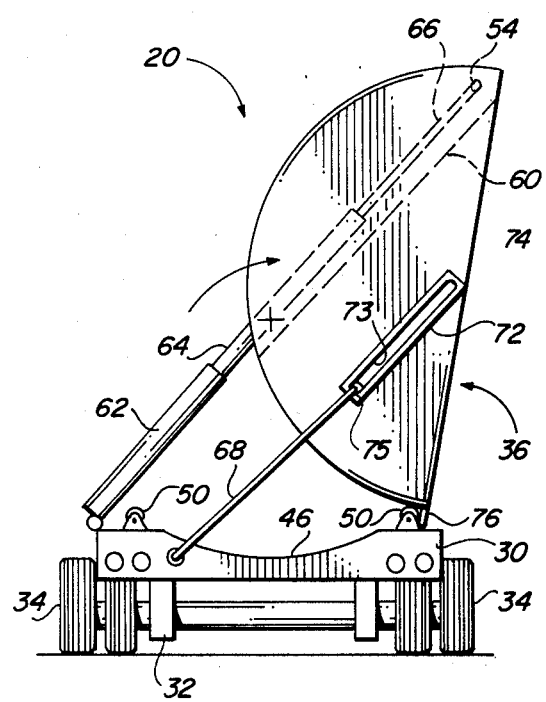
FIG. 7 is a schematic rear elevation of the assembly of FIG. 1, shown with the bin thereof tilted to a full unloading position, partially inverted.

As can be seen in FIGS. 6 and 7, as ram 54 continues to be extended, side 40 nearest the bottom of ram 54 tilts up from engagement with rollers 50 and bin 36 pivots around edge 58 at the opposite side 40 of bin 36 while maintaining contact with rollers 50 at that side of frame 30. As bin 36 rotates, the upper end of link 68 slides along channel 73 in retainer 72 (see FIG. 6) until it reaches the end 75 thereof (see FIG. 7), at which time link 68 prevents further tilting of bin 68. In FIG. 6, bin 36 is shown tilted to an about vertical position from the resting horizontal position of FIG. 4. This position is useful for loading and unloading. Further extension of ram 54 results in further tilting and actual inversion of bin 36 to the position of FIG. 7 for maximum speed of unloading and to facilitate unloading of materials which might otherwise stick in bin 36. It will be noted that as this position is being reached, bin 36 in effect moves laterally relative to frame 30 and overhangs the side of frame 30.

Figure 5:
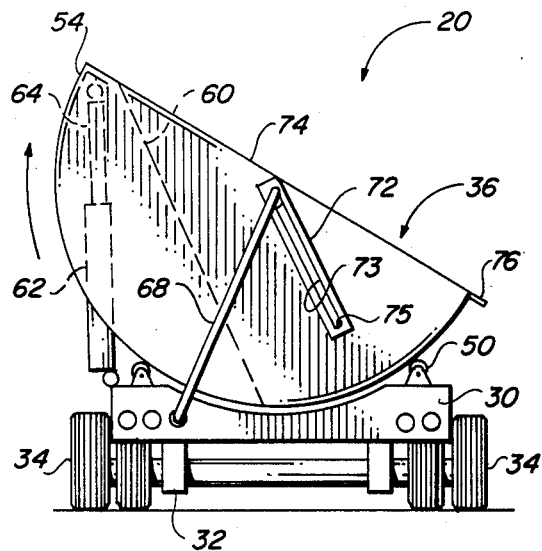
FIG. 5 is a schematic rear elevation of the assembly of FIG. 1, shown with the bin thereof in the rotated side loading position, still fully engaged with the frame thereof.

All throughout the bin rolling and tilting operations illustrated in FIGS. 5-7, bin 36 is fully braced and supported by ram 54 and links 68 for maximum safety and by the action of ledge 76 against rollers 50.

Accordingly, assembly 20 is efficient, durable, energy saving and safe. Bin 36 can be moved between the various resting and operative positions with a minimum of energy and a maximum of safety. Assembly 20 can be constructed simply and inexpensively of conventional materials.

FIGS. 8 & 9

Figure 8:
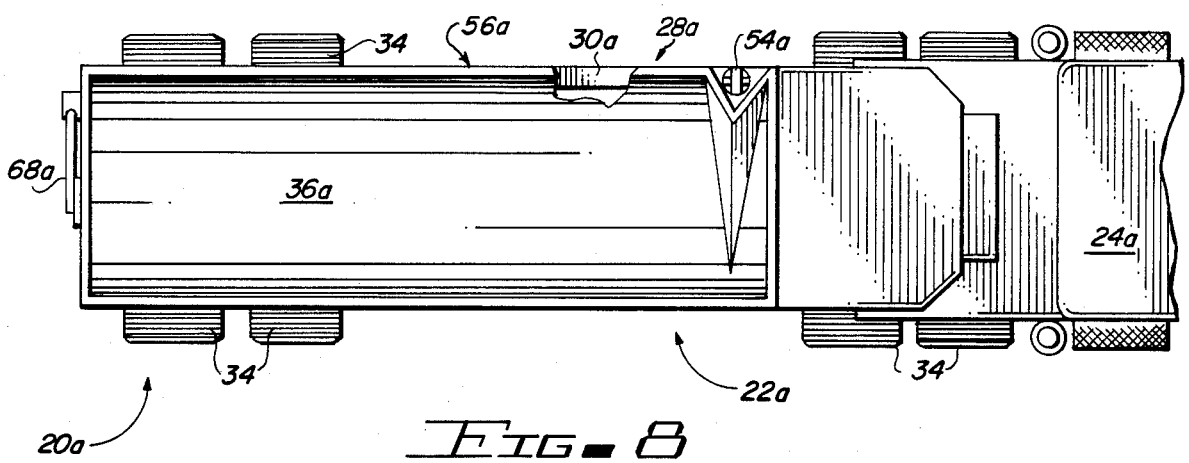
FIG. 8 is a schematic top plan view of a second preferred embodiment of the improved dump truck assembly of the present invention; and, FIG. 9 is a schematic top plan view of a third preferred embodiment of the improved dump truck assembly of the present invention.
Figure 9:
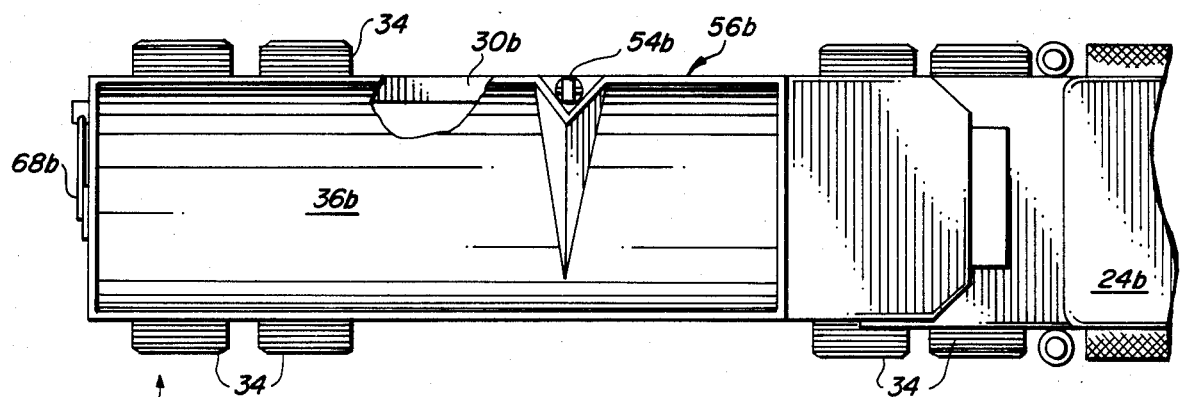

Two further preferred embodiments of the improved assembly of the present invention are schematically depicted in FIGS. 8 and 9. They differ from the embodiment of FIG. 1 only in the number and position of their ram and tilt link. Thus, FIG. 8 depicts assembly 20a. Components thereof similar to those of FIG. 1 bear the same numerals, but are succeeded by the letter "a". It will be noted that only one tilt link 68a is used in assembly 20a, while the ram 54a thereof is positioned at side 56a of frame 30a, to provide maximum support to bin 36a and trailer 28a of truck 22a.

In FIG. 9, assembly 20b is depicted. Components thereof bear the same numerals as those of assembly 20, but are succeeded by the letter "b". It will be noted in FIG. 9 that assembly 20b uses only a single link 68b, while the single ram 54b which is used is connected to side 56b about two thirds of the way toward the front end of frame 30b. In all other respects, assemblies 20a and 20b are identical to assembly 20, and they have similar functions and properties.

Figure 10:
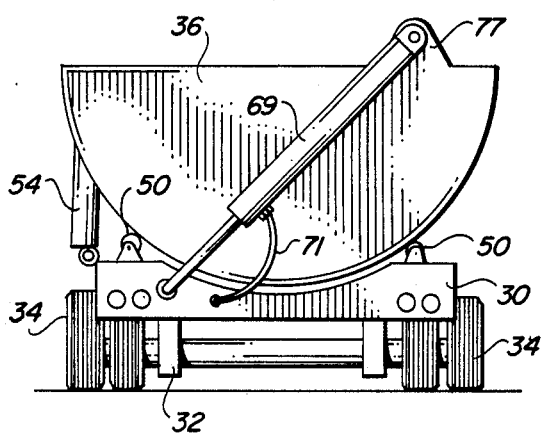
FIG. 10 is a schematic rear elevation of an assembly as shown in FIG. 1, except that a hydraulic ram has been substituted for a rigid link.
Figure 11:
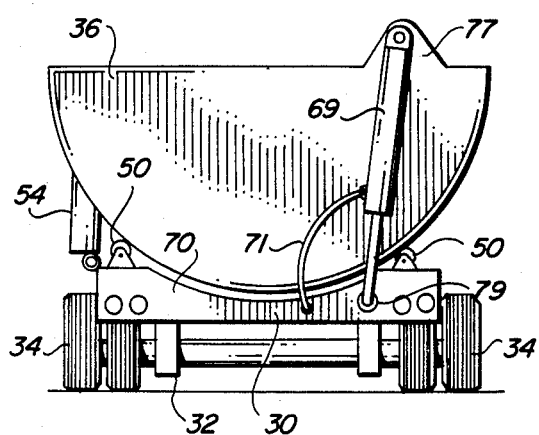
FIG. 11 is a schematic rear elevation of an assembly as shown in FIG. 1, except that a hydraulic ram has been substituted for the rigid link and is attached to the frame at a different position.

FIGS. 10 and 11

The assembly shown in FIG. 10 is essentially the same as that shown in FIG. 4, except that a hydraulic ram 69 and associated actuating line 71 has been substituted for rigid link 68. The provision of ram 69 allows for more flexibility in determining the degree of rotation of bin 36, the point of tilting of bin 36 away from the rollers 50, the rate of rotation, etc. The use of such a ram provides a degree of flexibility not present when one uses a link 68 of fixed length.

The assembly shown in FIG. 11 has a hydraulic ram 69 and actuating line 71 substituted for link 68 in the assembly of FIG. 4 and further shows the lower end of ram 69 secured to frame 30 at a position 79 other than that shown in FIG. 4. Here again, the flexibility of the assembly is disclosed, with the versatility of ram 69 enabling various positionings of ram 69 and the attachment thereof to bin 36 and frame 30, the specific location of which would be determined by obvious design considerations.

Figure 12:
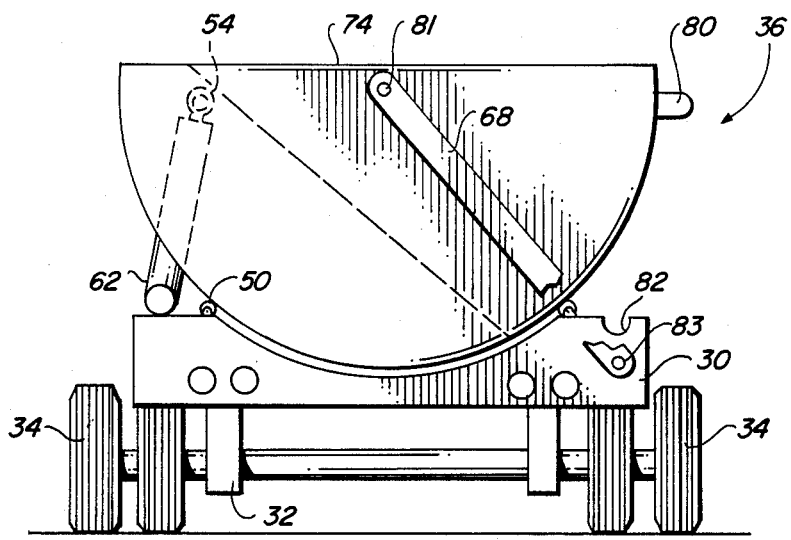
FIG. 12 is a schematic rear elevation of another preferred embodiment of the invention showing a rigid link attached to the axis of rotation of the bin, when the bin is at rest.
Figure 13:
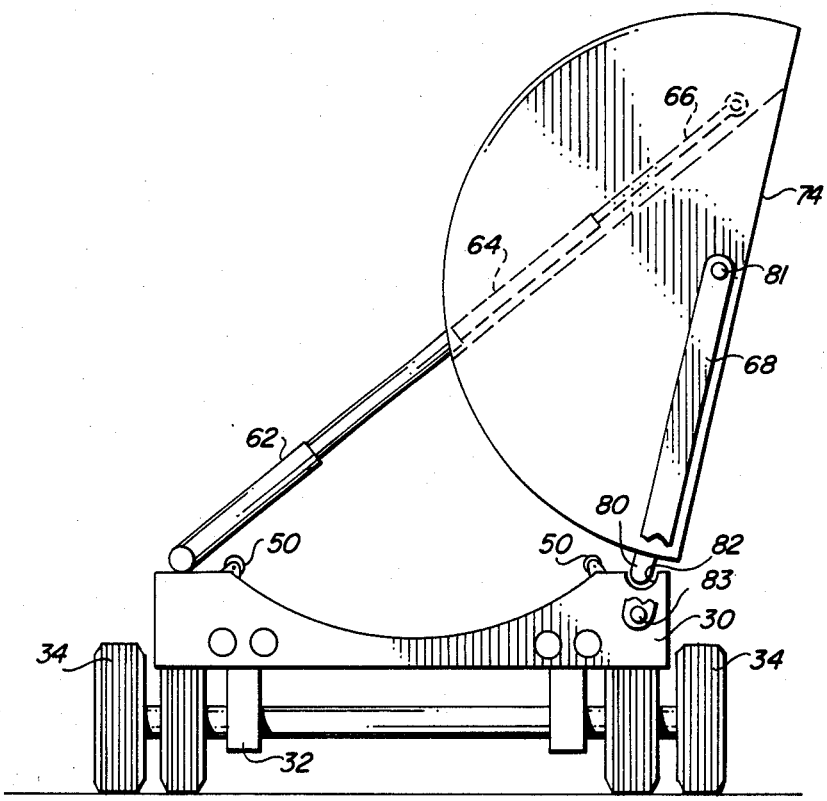
FIG. 13 is a schematic rear elevation of a preferred embodiment of FIG. 12 showing the bin in a fully extended, dumping position.

FIGS. 12 and 13

The assembly shown in FIGS. 12 and 13 is essentially the same as that shown in FIG. 4, except that a different arrangement of the link arm 68 is provided and further, an additional automatic bin position locking means is provided. This embodiment utilizes a fixed link 68 whose lower end is connected by pivot means 83 to the right side of frame 30 and whose upper end is connected by pivot means 81 to bin 36. Pivot means 81 lies at the axis of rotation of bin 36.

A tooth-like projection 80 is provided on bin 36 which is adapted to mate with recess 82 in frame 30 locking it therein and preventing further rotation of bin 36 about axis 81. As can clearly be seen in FIG. 12, rotation of bin 36 on rollers has no effect on link 68 since pivot means 81 lies at the axis of rotation of bin 30. When bin 36 is rotated clockwise until projection 80 abuts roller 50, ram 62 starts to raise bin 36 and rotate it with link 68 clockwise about pivot point 83, until ram 62 is fully extended. Link 68 serves to steady bin 30 during the dumping operation. After dumping, ram 62 is gradually deactivated to first allow counter-clockwise rotation of bin 36 about pivot means 83 and, after seating of bin 36 on rollers 50, subsequent counter-clockwise rotation of bin 36 to its original position as shown in FIG. 12.

Various other modifications, changes, alterations and additions can be made in the improved assembly of the present invention, its components and their parameters. All such changes, modifications, alterations and additions as are within the scope of the appended claims form part of the present invention.

What is claimed is:

1. An improved side unloading dump truck assembly, said assembly comprising, in combination:
   (a) a dump truck, including a motor and a truck body comprising a generally horizontal frame supported on a plurality of rotatable wheels;
   (b) a plurality of spaced rollers connected to said frame;
   (c) a container bin having an open top and rotation preventing means secured thereto, said bin being supported on said rollers;
   (d) an upwardly directed tilt link pivotally connected to one end of said frame and to said bin adjacent the upper end thereof;
   (e) an upwardly directed ram pivotally connected to one side of said frame and to said bin at points remote from said link, whereby initial extension of said ram rotates said bin around its longitudinal axis on said frame rollers without lateral movement of said bin until further such rotation is prevented by said rotation preventing means, whereupon further extension of said ram lifts one side of said bin from said rollers, tilts and rotates said bin and pivots said bin around the opposite side thereof on said rollers to effect side unloading of said bin.

2. The improved assembly of claim 1 wherein said tilt link is pivotally connected to said frame adjacent the side thereof to which said ram is connected and wherein said link extends upwardly across said assembly and is connected to the upper end of said bin adjacent the opposite side of said frame.

3. The improved assembly of claim 2 wherein said ram is connected to said bin adjacent the upper end thereof.

4. The improved assembly of claim 3 wherein said bin has a curved bottom and sides and wherein said frame has an upper surface with a dished portion receiving said bin bottom and a portion of said bin sides.

5. The improved assembly of claim 4 wherein said rollers are disposed on said frame upper surface outside said dished portion to suspend said bin in said dished portion above the surface thereof for easy rolling of said bin.

6. The improved assembly of claim 5 wherein said assembly includes a pair of said tilt links disposed on opposite ends of said frame.

7. The improved assembly of claim 6 wherein said ram is disposed on one side of said frame between said tilt links and wherein said bin is configured to provide clearance for said ram.

8. The improved assembly of claim 4 wherein said assembly includes a single tilt link and a single ram and wherein said ram is disposed at the opposite end of said frame from said tilt link.

9. The improved assembly of claim 4 wherein said assembly includes a single tilt link and a single ram and wherein said ram is disposed at the side of said frame adjacent the opposite end of said frame from said tilt link.

10. The improved assembly of claim 5 wherein said ram is an hydraulic ram, wherein said truck comprises a cab and a trailer, the latter bearing said frame and wherein said ram is long enough to enable said bin to rotate to a position wherein said bin is inverted to assure complete unloading from said bin.

11. The improved assembly of claim 1 wherein said bin includes roller-engaging stop means adjacent the upper end thereof at the side thereof away from that frame side to which said ram is connected, so as to prevent disengagement of said bin with said rollers on said stop means frame side.

12. The improved assembly of claim 1 wherein the length of said link is variable.

13. The improved assembly of claim 1 wherein said link comprises a hydraulic ram.

* * * * *